June 17, 1947.  J. W. THOMAS  2,422,375
TOOL HOLDER
Filed April 12, 1944  2 Sheets-Sheet 1
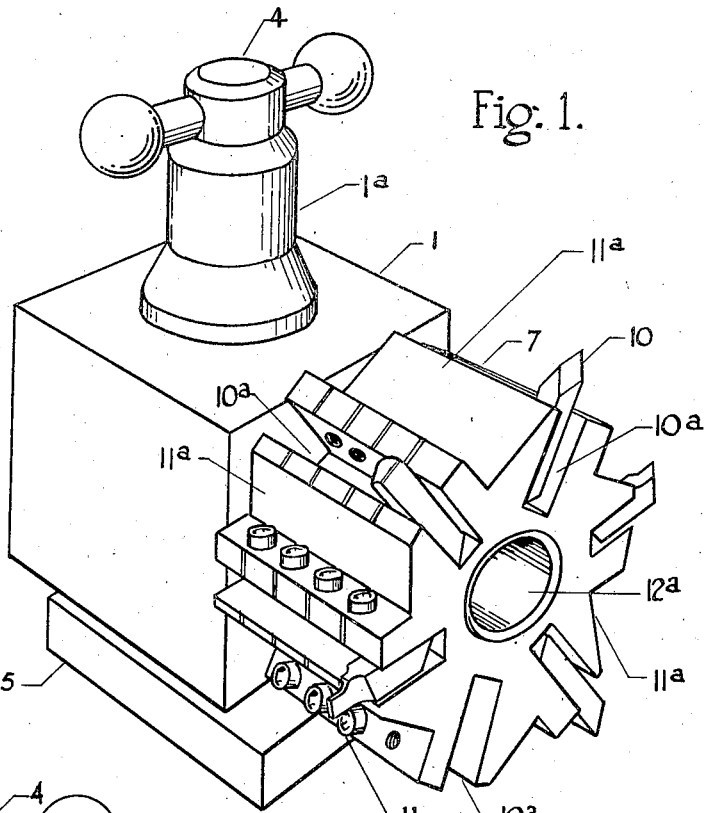
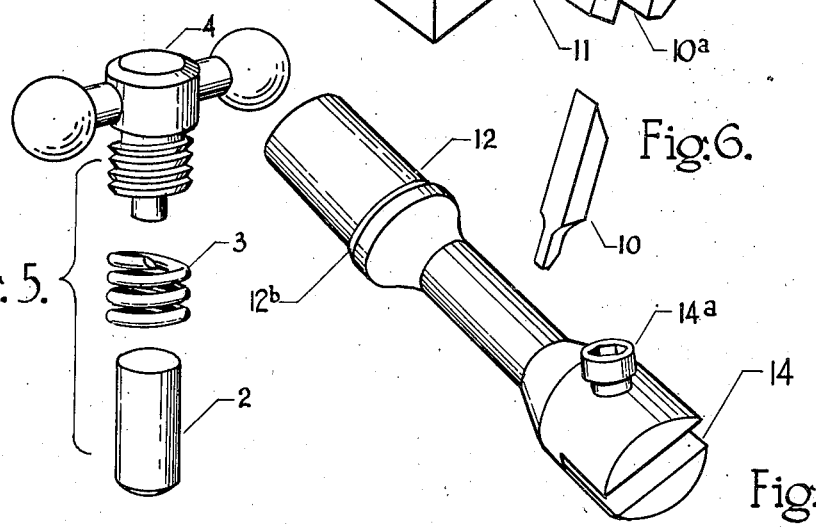

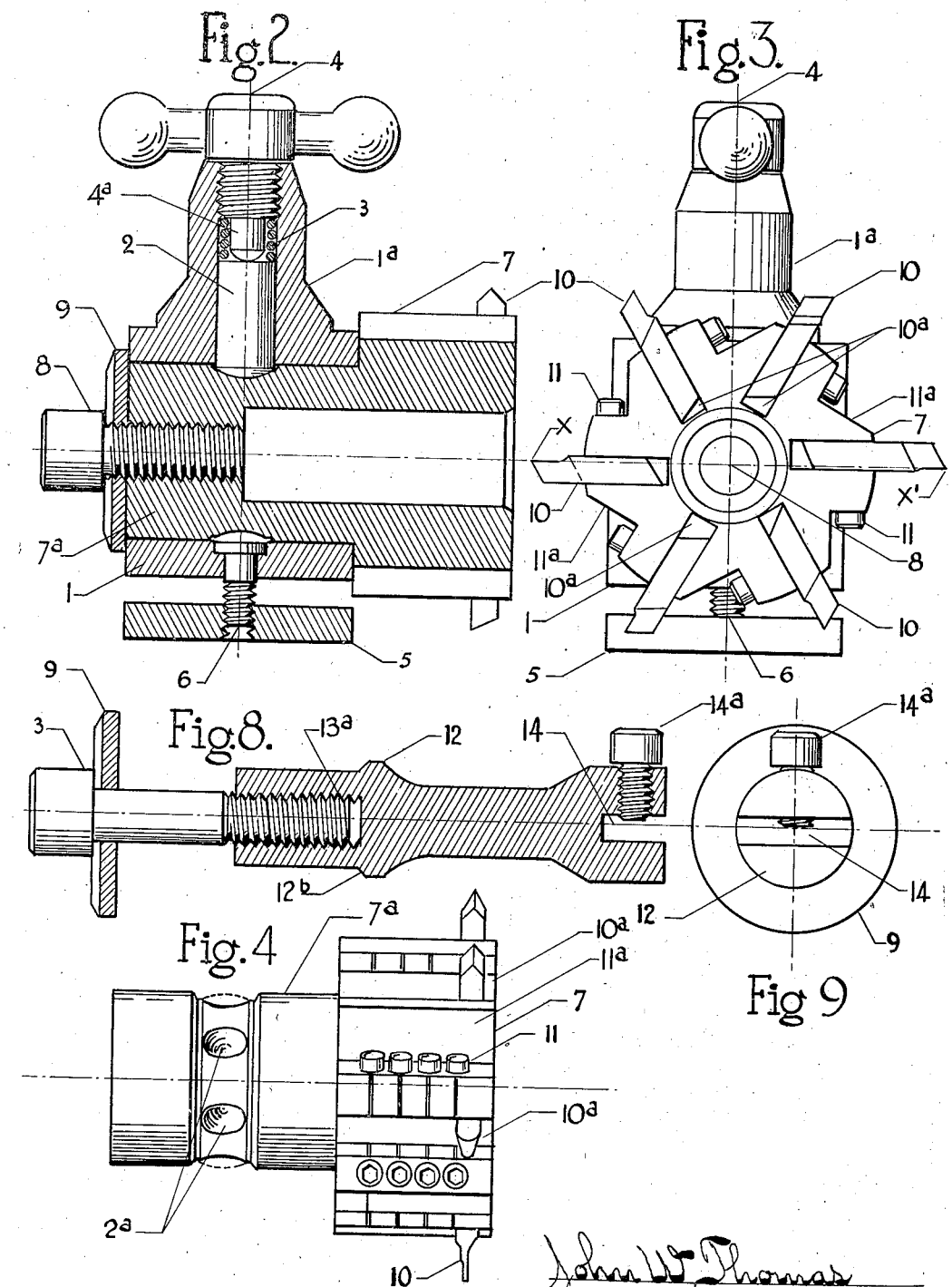

Patented June 17, 1947

2,422,375

UNITED STATES PATENT OFFICE 2,422,375

TOOLHOLDER

John W. Thomas, Springfield, Ohio

Application April 12, 1944, Serial No. 530,655

4 Claims. (Cl. 29—48)

This invention pertains to metal working, and more particularly to a multiple tool mount for accurately positioning each of a plurality of lathe tools sequentially in operative work engaging relation to the lathe centers.

In the present invention there is contemplated rapid duplication of turned metal parts by setting up in the present mount or tool holder a series of suitably shaped cutting tools so positioned to successively engage the work at predetermined positions for rough turning and finishing of contoured surfaces, forming flanges, radii, chamfers and other convolutions of the work piece, upon rotary adjustment of a tool carrying portion of the mount or tool holder which is indexed to properly position each tool as it is brought to its operating position, which may be done by an otherwise unskilled operator.

The object of the invention is to improve the construction as well as the means and mode of operation of adjustable multiple tool holders whereby they may not only be economically manufactured, but will be more efficient in use, capable of a wide range of operations and production of work shapes, of increased accuracy, capable of uniform operation, having relatively few parts and be unlikely to become out of order.

A further object of the invention is to enable a series of lathe tools to be variously positioned for successive engagement with a work piece at various positions axially thereof, and having indexing means for accurately positioning the tools one at a time in operating position.

A further object of the invention is to provide a tool holder having the herein described advantageous structural features and the inherent meritorious characteristics and mode of operation herein described.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Referring to the drawings, wherein is shown the preferred but obviously not necessarily the only form of embodiment of the invention, Fig. 1 is a perspective view of the assembled tool holder showing a series of interchangeable cutters or tools positioned thereon for successive presentation in the operative position.

Fig. 2 is a vertical sectional view thereof.

Fig. 3 is an end elevation from the right of Figs. 1 and 2.

Fig. 4 is a side elevation of the rotary tool carrier removed from its support.

Fig. 5 is a detail perspective view of the indexing plunger, the plunger spring and locking screw, removed from the assembly.

Fig. 6 is a detail perspective view of one of the interchangeable cutting tools removed from the holder.

Fig. 7 is a perspective view of a boring bar removably engageable with the mount or tool holder.

Fig. 8 is a longitudinal sectional view of the boring bar attachment.

Fig. 9 is an end view thereof.

Like parts are indicated by similar characters of reference throughout the several views.

The present tool holder is primarily for use with a conventional lathe, but is also applicable to a hand screw machine, a turret lathe, or other machine tool wherein a series of different tools are to be employed in a predetermined sequence.

The instant tool mount is particularly useful when a relatively large number of duplicate work parts are to be produced, and when the operations are to be performed by unskilled operators. In such event a tool model is first made accurately to size by conventional machine operations and while mounted in the lathe between the lathe centers, with the present tool holder positioned on the compound rest of the lathe, a skilled tool setter mounts and adjusts the several tools in the tool holder in proper relation with the work piece for performing their several functions, when brought successively to operative position as hereinafter described.

The tools or cutter bits having been once properly set and secured in the holder the successive operations performed thereby on the work piece become merely routine.

Referring to the drawings, a support 1 comprising a substantially rectangular block is adjustably secured upon the compound rest of a lathe by means of the camp plate 5 engageable within the gibs or ways of the lathe rest, by means of the clamp screw 6. Journaled within the support 1 is a revoluble tool carrier comprising a polygonal, radially slotted head 7 and a shaft or neck portion 7a which extends within a corresponding opening in the support block 1, for rotation about a horizontal axis. The tool carrier is held in the support 1 against axial retraction by a collar 9 secured to the extremity of the carrier shaft or neck 7a by a screw 8 having axial threaded engagement therein. Within radial slots 10a of the tool carrier head 7 are interchangeably mounted a plurality of cutters or tool bits 10. The tool carrier head 7 is relatively wide, and the slots 10a extend in an axial direction the full width of such head 7. The slots 10a are of sufficient length that a cutter or tool bit 10 may be engaged therein at any of a plurality of different positions longitudinally of the slot. For certain operations wherein two tools may be simultaneously used for engagement with the work at relatively spaced points, such tools may be secured in suitably spaced relation longitudinally of the same slot. Ordinarily, as shown in the drawings tools of different shape, for performing different operations or for producing different surface contours are fixedly, but removably secured in each of the slots 10a of the carrier head 7, by set screws 11. To enable convenient access to the tool clamp screws 11, the carrier head 7 is indented or longitudinally rabbetted at 11a intermediate successive tool receiving slots 10a.

The slots 10a are not exactly symmetrical with the radial lines of the carrier head 7, but as shown in Fig. 3 are slightly offset in parallel relation with the radii of the carrier head. The relation is such that the cutting points of the tools carried thereby will be disposed exactly on a radial line of the head as shown at x and x' of Fig. 3. The tool at the left of Fig. 3 is disposed with its cutting point x in work engaging position, exactly in the horizontal plane of the axis or center of rotation of the carrier head, which, when the tool holder is properly mounted on a lathe, is also coincident with the plane of the lathe centers.

Upon rotation of the tool carrier to successively present different tools in operative position, the carrier is arrested with the cutting points of different tool bits successively, exactly in the position indicated at x in Fig. 3, which is the operating position in the common plane of the lathe centers and of the axis of the tool carrier. If the lathe is operated in reverse direction the cutter point x' becomes effective and is also in the plane of the tool holder center and lathe centers. To index the carrier head 7 in order that the tools 10 may be accurately positioned successively at the operating position, the shaft or neck 7a of the tool is provided at peripherally spaced positions with concave depressions or recesses 2a to receive the end of a reciprocatory indexing plunger 2, mounted in a hollow boss 1a, projecting upwardly from the top of the support 1.

Bearing upon the upper end of the indexing plunger 2 is a helical spring 3 which abuts at its upper end upon the screw 4 threaded in the boss 1a and surrounds an axial extension 4a of the screw. The screw 4 normally maintains the spring 3 under tension, and when adjusted to the limit of its range exerts thrust pressure of the extension 4a upon the indexing plunger 2 to maintain it in locking engagement in one or the other of the depressions or sockets 2a. As is shown in Fig. 4, the indexing sockets or depressions 2a are formed within a peripheral groove in the neck 7a of the rotary tool carrier head 7.

The bottom of the peripheral groove is transversely convex in order that the margins of the sockets or depressions 2a may lie in planes, perpendicular to their axes. Upon partial retraction of the screw 4, by which pressure upon the plunger is relieved, the plunger will yield against the tension of the spring to permit rotation of the tool carrying head 7 from one position to another, in each of which the plunger will automatically engage in the corresponding socket or depression, under influence of the spring 3, and may be locked therein by tightening of the screw 4 into thrust engagement of the extension 4a into thrust engagement with the plunger.

In addition to the radially disposed cutter bits 10, which may be variously engaged in different positions longitudinally of the slots 10a according to the shape and dimensions of the work piece, the tool holder is adapted to detachably receive a boring bar 12, in axial alignment with the tool carrying head 7. The tool carrier head 7 is provided with an axial bore 12a the terminal of which is chamfered to form a seat for a beveled peripheral shoulder 12b of the boring bar 12. The outer extremity of the boring bar 12 is bifurcated at 14 to receive a boring tool or other work bit, which is held therein by a set screw 14a. The opposite extremity of the boring bar, beyond the beveled shoulder 12b is of a diameter to fit within the axial bore 12a of the carrier head 7, and is axially bored and threaded at 13a to receive a clamp screw 13 extending through the clamp collar 9 in lieu of the screw 8 to clamp the boring bar in its adjusted position.

In mounting the holder upon the tool rest of a lathe, the tool carrier 7—7a is removed from the support 1 and the screw 4 and indexing plunger 2 are also removed. The clamp screw 6 is then accessible for engagement by a screw driver introduced through the bore in the support boss 1a, which otherwise is occupied by the plunger 2 and screw 4.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A tool holder, wherein a rotary tool carrier is adjustable to different rotative positions to dispose a selected tool carried thereby in work engaging position, including a support engageable with a machine tool on which the carrier is mounted for rotary adjustment, and indexing means therefor, including a reciprocatory plunger mounted in said support for reciprocation into and out of locking engagement with the carrier, a screw mounted in the support for thrust engagement with the plunger to lock the plunger in engagement with the carrier, and a spring yieldingly urging the plunger into locking engagement with the carrier and against the yielding resistance of which the plunger is retractable to enable rotary adjustment of the carrier when the thrust engagement of the screw with the plunger is relaxed.

2. A structure, wherein a rotative member is mounted on a support for relative adjustment to one of several rotative positions, including a reciprocatory plunger mounted in the support and operatively engageable with the rotative member to lock said member in an adjusted position, a shouldered screw engaged in the support in axial alignment with the plunger and having thrust engagement therewith upon adjustment of the screw, a helical spring interposed between the shoulder of the screw and the plunger and surrounding a portion of the screw of reduced diameter yieldingly maintaining the plunger in engagement with the rotative member while the thrust engagement of the screw with the plunger is relaxed.

3. A structure, wherein a rotative member is mounted on a support for relative rotation to one of several rotative positions of adjustment, a spring pressed plunger mounted in the support having yielding engagement with the rotative member, a spring yieldingly maintaining the plunger in engagement with the rotative member, and a screw having thrust engagement with the spring and the plunger to lock the plunger in engagement with the rotative member.

4. A structure, wherein a rotative member is mounted on a support for relative rotation to one of several rotative positions of adjustment, a reciprocatory plunger mounted in the support and engageable with the rotative member when the latter is in either of several rotative positions of adjustment, a spring and a screw, both common to the plunger and to each other and both urging the plunger into locking engagement with the rotative member, the plunger being yieldingly disengageable therefrom against the tension of the spring when the screw is disengaged from the plunger, and locked in engaging relation with the rotative member by engagement of said screw with the plunger.

JOHN W. THOMAS.

REFERENCES CITED

The following references are of record in the file of this patent:

UNITED STATES PATENTS

| Number | Name | Date |
|---|---|---|
| 740,107 | Dworzek | Sept. 29, 1903 |
| 1,031,956 | Newmann | July 9, 1912 |
| 1,195,390 | Newmann | Aug. 22, 1916 |
| 1,361,198 | Strand | Dec. 7, 1920 |
| 2,344,509 | Guenther | Mar. 21, 1944 |
| 293,397 | Baker | Feb. 12, 1884 |
| 1,143,252 | Conradson | June 15, 1915 |
| 1,175,283 | March | Mar. 14, 1916 |
| 2,348,292 | Gross | May 9, 1944 |